July 17, 1951      J. M. OCKER      2,560,590

INSTRUMENT FOR SHIP ZIG-ZAG OPERATIONS

Filed Oct. 12, 1948

INVENTOR.
JOHN M. OCKER
BY
D.C. Snyder

Patented July 17, 1951

2,560,590

UNITED STATES PATENT OFFICE 2,560,590

INSTRUMENT FOR SHIP ZIGZAG OPERATIONS

John M. Ocker, United States Navy, Arlington, Va.

Application October 12, 1948, Serial No. 54,187

6 Claims. (Cl. 235—83)

(Granted under the act of March 3, 1883, as amended April 30, 1928; 370 O. G. 757)

This invention relates to an instrument devised for conveniently following a zig-zag plan for evasive maneuvering of a ship in a danger zone at sea.

More particularly, the present invention is embodied in an adjustable navigation instrument having means for indicating the general or base line course and the deviations therefrom to be followed when pursuing a predetermined zig-zag course.

No reference is here made to prior patented art, as none is known to exist. However, it of course is well understood that plans of this general nature have been made and followed in the form either of written data or of a plotted series of straight zig-zag lines.

It is the primary object of this invention to eliminate the not infrequent mistakes that result from hurried preparation of a diagram or other recordation of data for converting angular (zig-zag) movements to a true or basic course while on the bridge of the vessel. This object is accomplished by providing a base member carrying an azimuth scale of 360°, and an adjustable member mounted thereon and having a base course line which may be set in any position relative to said scale to indicate the ship's true course. The adjustable member also carries, in the form of data or printed matter, instructions for carrying out the designated zig-zag plan.

It is another important object to so design the adjustable member that it has a transparent wall spaced from the base member to provided a pocket in which a plurality of plans in the form of templates may be carried, so that any one of the templates may be placed on top of the others to reveal the plan to be followed. Preferably, the pocket is formed as a slot cut edgewise into the adjustable member. Preferably, also, the two members are in the shape of circular discs concentrically disposed, with means at the center for locking them in any preselected relationship.

The foregoing and further objects of the present invention should become readily apparent from a study of the following description when taken in conjunction with the accompanying drawing, wherein.

Figure 1:
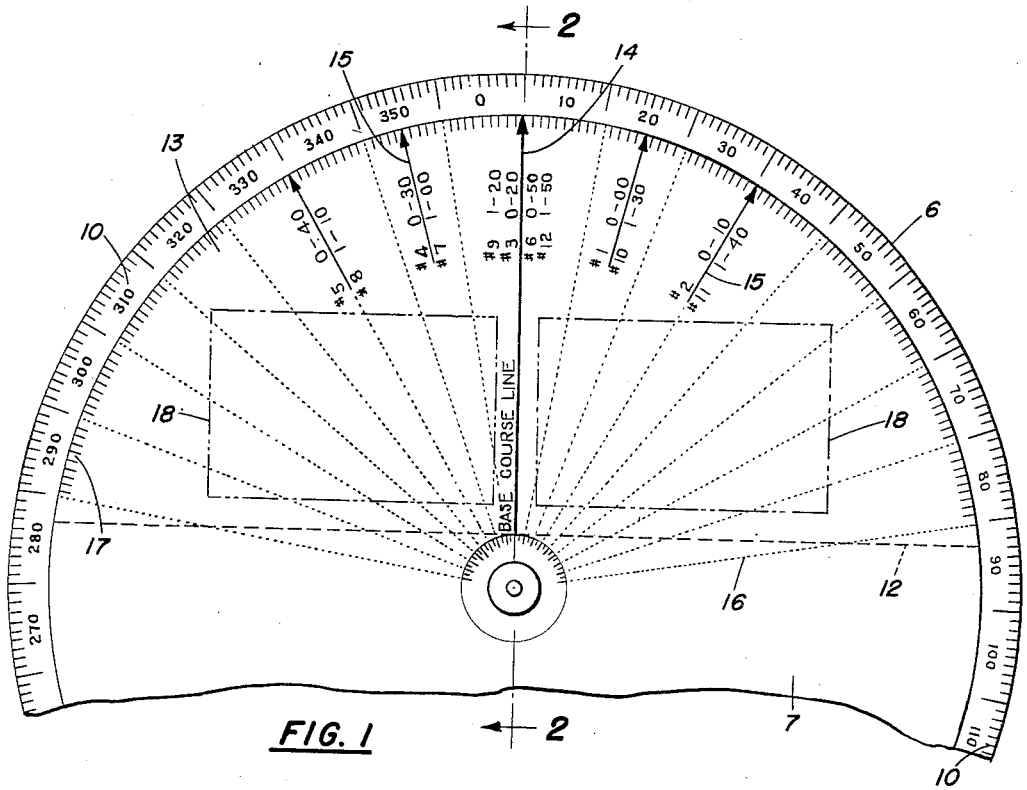
Fig. 1 is a top plan view of the complete instrument, with a portion broken away to conserve space.
Figure 2:
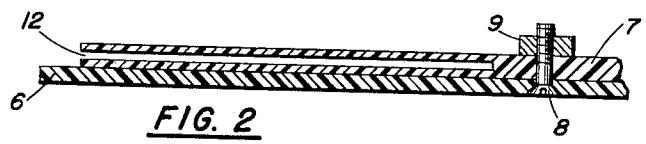
Fig. 2 represents a section taken on the plane of line 2—2, Fig. 1, with the templates removed.
Figure 3:
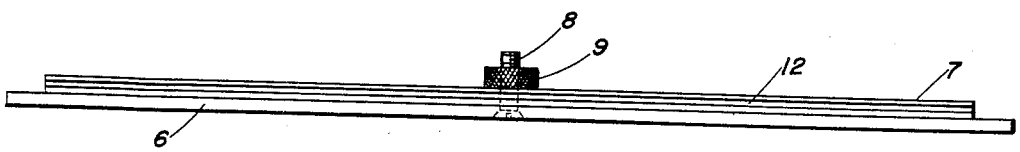
Fig. 3 is an edge view looking into the top of Fig. 1.

With continued reference to the drawing, wherein like numerals designate like parts, there is shown an instrument comprising a base plate 6, preferably in the form of a disc; a superposed adjustable plate 7, also preferably in disc form and of somewhat less diameter than the plate 6; and a pivotal screw 8 holding the plates in concentric relationship, and a knurled nut 9 that is manually operable to clamp the plates together or to release them for relative oscillation. The instrument is, for example, about ten inches in diameter, but it may be made larger or smaller, its minimum size being determined by clarity of view of the indicia appearing thereon.

The rim of the upper face carries an imprinted or otherwise formed scale of indicia 10 comprising 360 equal divisions, marked in fractions so as to be easily readable for indication of true course or azimuth. The rim of the plate 7 is adjacent the scale 10 for cooperation therewith in a manner to be described.

Figure 4:
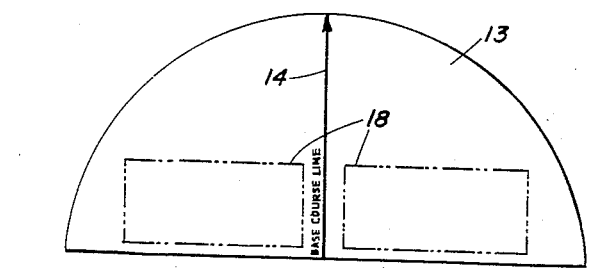
Fig. 4 is a face view, to a reduced scale, of one of the templates used in the instrument.

The member 7 may consist of a thin sheet of fibrous or plastic material with a zig-zag plan printed or etched thereon, or it may be a transparent plate overlying a template carrying the plan. Preferably, however, as illustrated, it takes the form of a transparent plate having a slot 12 cut edgewise thereinto to form a pocket for reception of a plurality of templates 13, the topmost one of which is visible to reveal the preselected zig-zag plan. One of these templates is shown in Fig. 4 and it comprises, essentially, a base course line 14 having an arrowhead cooperative with the scale 10 to indicate the true or general course when the plates are locked together by the nut 9.

Each template 13 has marked thereon a set of indicia 15 comprising notations showing the various changes in course for a given plan, the numerical order of such changes and the times at which the changes are to be made. Arrows are associated with the figures and point onto the 360° scale 10 to show the true course for each leg of the zig-zag plan. The arrows and one set of figures (either for time or for chronological order of change) would suffice but, preferably, the complete disclosed arrangement is utilized. The template also may carry radiating lines 16 and peripheral degree spacings 17 to facilitate marking of the plan upon the template. For convenience and for insurance against error, it is further desirable to print the plan upon the template, as at 18. Due to the small size of the rectangles 18, the plan is not disclosed in the drawing. It takes the following form to correspond with the illustrated indicia 15.

ZIG-ZAG PLAN NO. 77

*Two-hour plan*

[Repeat plan at end of the second hour]

| Time | Leg No. | Amount change | Deviation from B. C. | Time | Leg No. | Amount change | Deviation from B. C. |
|------|---------|---------------|----------------------|------|---------|---------------|----------------------|
| 0-00 | 1 | 15R | 15R | 1-00 | 7 | 15L | 15L |
| 0-10 | 2 | 15R | 30R | 1-10 | 8 | 15L | 30L |
| 0-20 | 3 | 30L | 0 | 1-20 | 9 | 30R | 0 |
| 0-30 | 4 | 15L | 15L | 1-30 | 10 | 15R | 15R |
| 0-40 | 5 | 15L | 30L | 1-40 | 11 | 15R | 30R |
| 0-50 | 6 | 30R | 0 | 1-50 | 12 | 30L | 0 |

Operation of the instrument should be fairly obvious. The general or ultimate true course is set by loosening the nut 9, rotating the upper plate 7 to point the base course line 14 to the proper azimuth on the scale 10, and clamping the plates together by tightening the nut. Thereafter the true course for each leg of the plan can be read on the scale 10 with reference to the appropriate arrow of the indicia 15, the arrows being numbered in chronological order to indicate the sequence of changes in course. When a new plan is to be followed, the templates are removed from the slot 12 and a different one is placed at the top of the stack.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A navigational instrument comprising a pair of relatively rotatable discs concentrically arranged with respect to each other; a 360 degree graduated scale upon one of said discs concentric with its center; a radial base course line upon the other disc cooperative with said graduated scale to indicate a base course; and a plurality of angularly spaced radial lines upon the said other disc cooperative with said graduated scale to indicate a series of navigation courses terminating in a desired course, and indicia upon said other disc indicating the order and time that each radial line is to be used as a navigation heading.

2. A navigational instrument comprising a pair of relatively rotatable discs concentrically arranged with respect to each other; an annular graduated scale upon one of said discs concentric with its center; a radial base course line upon the other disc cooperative with said graduated scale to indicate a base course; a plurality of angularly spaced radial lines upon the said other disc cooperative with said graduated scale to indicate a series of navigation courses; and indicia adjacent all of said radial lines indicating the order and time that they are to be used.

3. A navigational instrument comprising a pair of relatively rotatable discs concentrically arranged with respect to each other; an annular graduated scale upon one of said discs concentric with its center; a radial base course line upon the other disc cooperative with said graduated scale to indicate a base course; a plurality of angularly spaced radial lines upon the said other disc cooperative with said graduated scale to indicate a series of navigation courses; and indicia adjacent all of said radial lines indicating the time each course should be started so as to terminate said series of navigation courses at a desired course.

4. A navigational instrument comprising a pair of relatively rotatable discs concentrically arranged with respect to each other; an annular graduated scale upon one of said discs concentric with its center; a radial base course line upon the other disc cooperative with said graduated scale to indicate a base course; a plurality of angularly spaced radial lines upon the said other disc cooperative with said graduated scale to indicate a series of navigation courses; and indicia adjacent all of said radial lines indicating the time each course should be started, the angular disposition of said radial lines and the indicated time for starting each course being correlated so that the said series of navigation courses terminates on the base course and on the same straight line as the initial base course.

5. A navigational instrument comprising a pair of relatively rotatable discs concentrically arranged with one upon the other, the bottom disc having a 360 degree peripheral scale, the top disc being transparent and slotted edgewise to form a pocket between its side surfaces, said pocket having sufficient depth and width to interchangeably receive any of a set of thin templates, and a template disposed in said pocket, said template carrying a radial base course line and a plurality of further angularly spaced radial lines cooperable with said peripheral scale to indicate a plurality of navigation headings, said template being provided with indicia indicating the order and time that each radial line is to be used as a navigation heading.

6. In the instrument described in claim 5, the indicia indicating the order and time for each radial line being disposed adjacent its respective radial line.

JOHN M. OCKER.

REFERENCES CITED

The following references are of record in the file of this patent:

UNITED STATES PATENTS

| Number | Name | Date |
|--------|------|------|
| 1,405,847 | Johnson | Feb. 7, 1922 |
| 2,329,274 | Lamoreaux | Sept. 14, 1943 |
| 2,415,581 | Doub | Feb. 11, 1947 |